F. B. BEAM.
COMBINED DISH DRAINER, STEAMER, ROASTER OR BAKING PAN.
APPLICATION FILED APR. 8, 1913.
1,103,169.
Patented July 14, 1914.
2 SHEETS—SHEET 1.
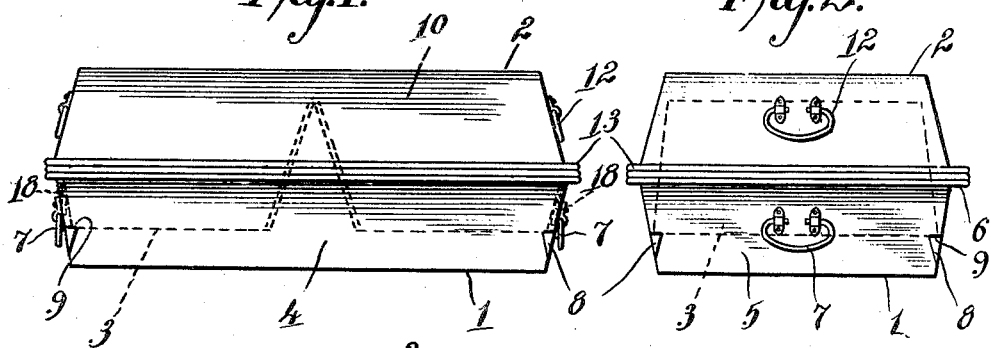
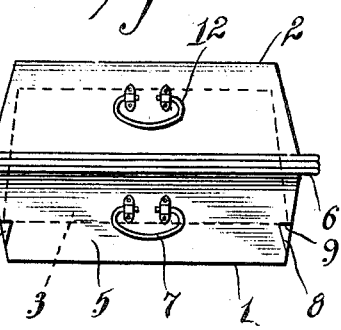
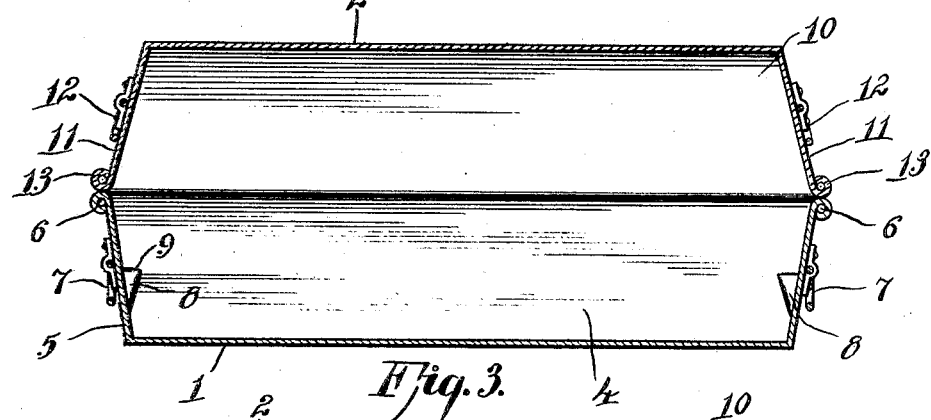
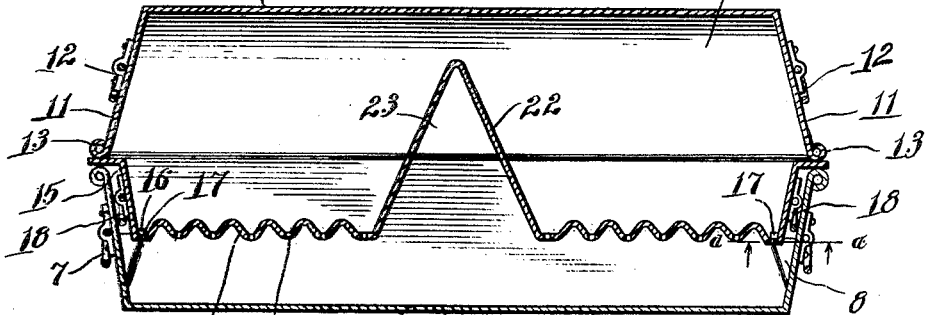

F. B. BEAM.
COMBINED DISH DRAINER, STEAMER, ROASTER OR BAKING PAN.
APPLICATION FILED APR. 8, 1913.

1,103,169.

Patented July 14, 1914.
2 SHEETS—SHEET 2.

Inventor
Frank B. Beam.

Witnesses
Paul M. Hunt
J. W. Garner

By Victor J. Evans.
Attorney

UNITED STATES PATENT OFFICE.

FRANK B. BEAM, OF ANAMOSA, IOWA.

COMBINED DISH-DRAINER, STEAMER, ROASTER, OR BAKING-PAN.

1,103,169.

Specification of Letters Patent. Patented July 14, 1914.

Application filed April 8, 1913. Serial No. 759,732.

*To all whom it may concern:*

Be it known that I, FRANK B. BEAM, a citizen of the United States, residing at Anamosa, in the county of Jones and State of Iowa, have invented new and useful Improvements in Combined Dish - Drainers, Steamers, Roasters, or Baking - Pans, of which the following is a specification.

This invention is an improved combined dish drainer, steamer and roaster or baking pan, the object of the invention being to provide an improved article of this kind which is extremely cheap and simple, is strong and durable and which may be used either for draining dishes or as a steamer or roasting pan.

The invention consists in the construction, combination and arrangement of devices hereinafter described and claimed.

Figure 6:
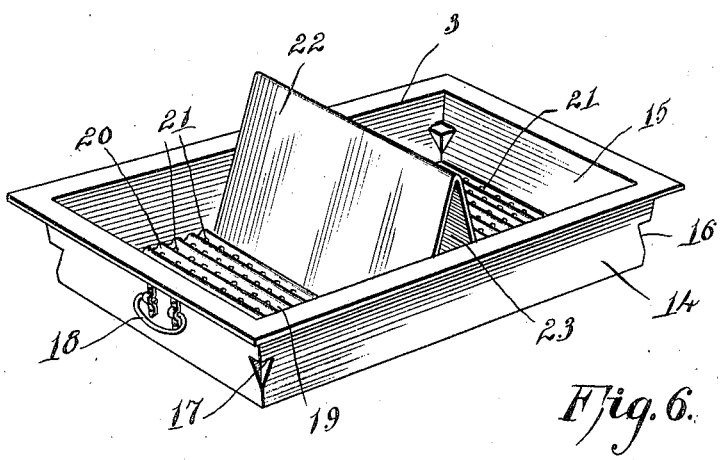
Figure 5:
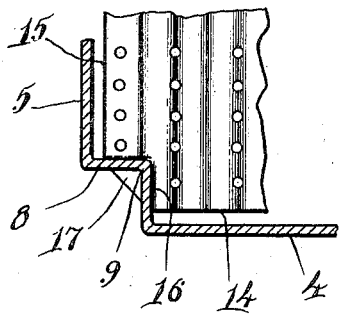
Figure 7:
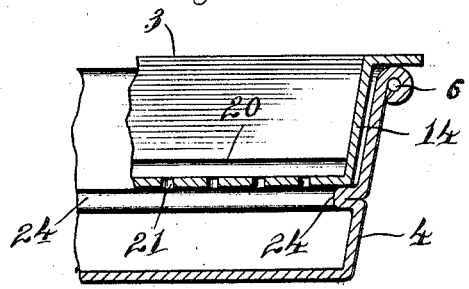

In the accompanying drawings:—Figure 1 is a side elevation of a combined dish drainer, steamer and roaster constructed in accordance with my invention. Fig. 2 is an end elevation of the same. Fig. 3 is a vertical longitudinal central sectional view of the same, for use as a roasting or baking pan. Fig. 4 is a similar view of the same arranged for use as a dish drainer or steamer. Fig. 5 is a detail horizontal sectional view on the plane indicated by the line *a—a* of Fig. 4. Fig. 6 is a detail perspective view of the drainer or steamer pan. Fig. 7 is a detail sectional view, showing a modification of the construction of the pan.

My improved dish drainer, steamer and roaster consists essentially of a pan 1, a cover 2 and a drainer 3. The pan, which may be made of any suitable material and which may be of any suitable size, has outwardly and upwardly inclined side walls 4 and end walls 5 and the upper edges of the side and end walls are bent around a reinforcing wire 6. At the centers of the end walls are pivotally attached handles 7. In the corners of the pan at points a suitable distance above the bottom thereof are inverted triangular supporting lugs 8 which are struck up therefrom and project inwardly so that each lug forms a supporting shoulder 9 at its upper, broadest end. The cover 2 has upwardly converging inclined side walls 10 and end walls 11 and the latter are provided at their centers with pivotally connected handles 12. The cover has an outwardly projecting reinforced flange 13 at its lower side extending around its side and end walls and is adapted to fit on the upper side of the pan and to be readily lifted and removed therefrom.

When the pan and the cover are used without the drainer, the device is adapted to be used as a steamer or roasting or baking pan, as will be understood. When the device is for use as a dish drainer, the draining element 3 is employed in addition to the pan and cover.

The drainer is of a size and shape adapting the same to fit in the upper portion of the pan, has inclined downwardly converging side walls 14 and end walls 15 and is formed in its corners with recesses 16 which are struck up and are of a size and shape adapting them to receive the lugs 8, the tops of the said recesses forming stops 17 which bear on the shoulders 9 that form the upper ends of the lugs. Hence, the drainer is adapted to fit in the upper portion of the pan and to project above the same. The drainer is provided with an outwardly extending flange at the upper sides of its side and end walls to bear on the upper edges of the side and end walls of the pan as shown.

The drainer is provided with pivoted handles 18 at the centers of its end walls. Its bottom 19 is formed with transverse corrugations 20 and with openings 21 in the bottoms of the channels between the ridges formed by the corrugations. The central portion of the bottom of the drainer is formed with a cross sectionally inverted V-shaped transversely arranged upwardly extending support 22 which is integral with the bottom and the base of which forms a transverse central opening 23 in the bottom. This support projects above the side walls of the drainer and when the device is in use, dishes and the like articles to be drained are placed on the bottom of the drainer and those which are near the center of the drainer are arranged to bear against and be supported by the cone, as will be understood.

The cover may be placed on the upper side of the drainer to cover the latter and the dishes and if the device is placed on a stove and a suitable quantity of water poured in the pan and heated, the steam from the water will be caused to thoroughly cleanse the dishes and the latter will be effectually drained. Certain articles can also be steamed advantageously by the use of the drainer in connection with the pan and cover, as will be understood.

In Fig. 7, I show a modified construction of my invention in which the supporting lugs and coacting recesses of the pan and drainer are dispensed with and the walls of the pan are formed with an inwardly projecting supporting bead or flange 24 for engaging the lower side of the drainer and supporting the latter at the appropriate elevation in the pan.

I claim:—

In combination with a pan having inwardly projecting supporting elements at its corners, arranged at a point below its upper edge, a drainer arranged to fit in the upper portion of the pan and having supporting means to bear on said supporting devices of the pan, and a cover arranged to fit on the upper side of the drainer when latter is in use in the pan and fit directly on the upper side of the pan when the drainer has been removed.

In testimony whereof I affix my signature in presence of two witnesses.

FRANK B. BEAM.

Witnesses:
J. H. HINES,
J. B. HAMMILL.